R. W. MEWES.
BORING BAR.
APPLICATION FILED JAN. 11, 1916.
1,217,481.
Patented Feb. 27, 1917.
2 SHEETS—SHEET 1.
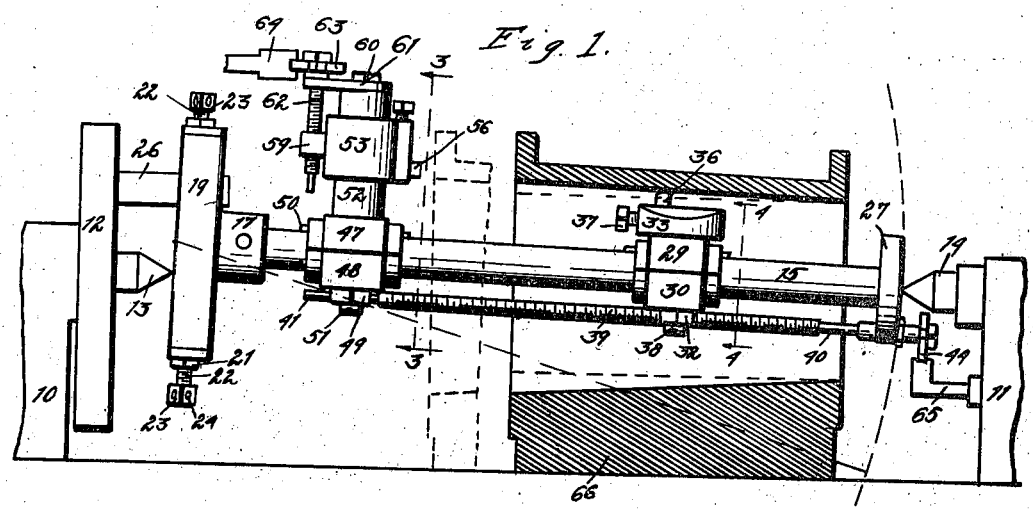
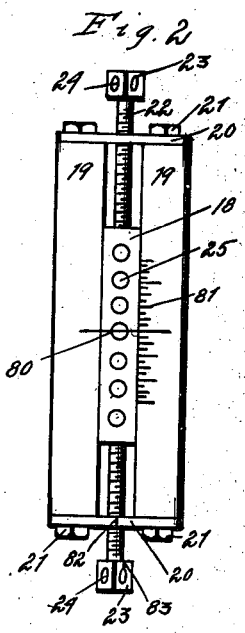
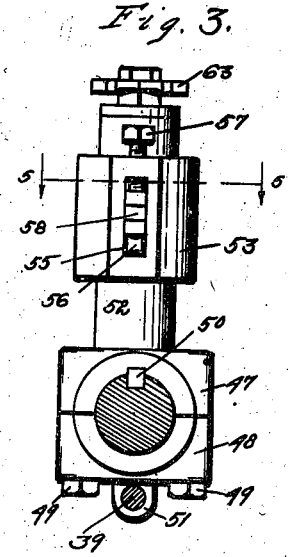
Witness.
G. F. Jurechek.
Inventor.
Richard W. Mewes R. W. MEWES.
BORING BAR.
APPLICATION FILED JAN. 11, 1916.
1,217,481.
Patented Feb. 27, 1917.
2 SHEETS—SHEET 2.
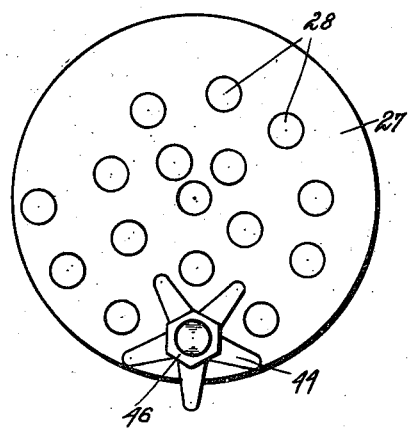
Fig. 7.
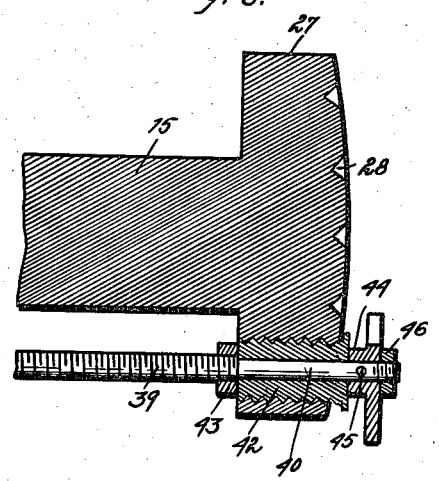
Fig. 8.
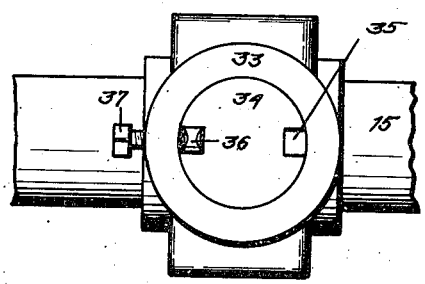
Fig. 6.
Fig. 5.
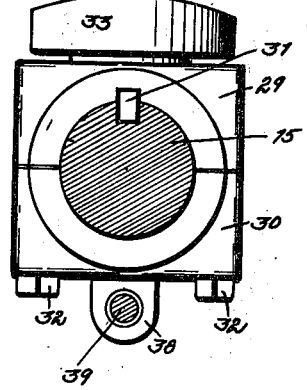
Fig. 4.

UNITED STATES PATENT OFFICE.

RICHARD W. MEWES, OF DES MOINES, IOWA.

BORING-BAR.

1,217,481. Specification of Letters Patent. Patented Feb. 27, 1917.

Application filed January 11, 1916. Serial No. 71,446.

*To all whom it may concern:*

Be it known that I, RICHARD W. MEWES, a subject of the King of Great Britain and resident of Des Moines, in the county of Polk and State of Iowa, have invented a certain new and useful Boring-Bar, of which the following is a specification.

The object of my invention is to provide a boring bar of comparatively simple, and durable construction.

A further object is to provide a boring bar for lathes and the like so constructed and arranged that it may be readily, easily and accurately adjusted for reaming or cutting out tapered openings.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of the boring bar, embodying my invention, mounted on a lathe.

Fig. 2 shows an end elevation of the adjustable member at the left-hand of the boring bar.

Fig. 3 shows a vertical, sectional view, taken on the line 3—3 of Fig. 1.

Fig. 4 shows a vertical, sectional view, taken on the line 4—4 of Fig. 1.

Fig. 5 shows a horizontal sectional view taken on the line 5—5 of Fig. 3.

Fig. 6 shows a top or plan view of the traveling cutter tool holder when in its upright position.

Fig. 7 is an end view of the curved plate member at the outer end of the boring bar, and Fig. 8 is a vertical, central sectional view through the same.

In the accompanying drawings, I have used the reference numeral 10 to indicate generally the head stock and the numeral 11 to indicate the tail stock mounted on the bed of a lathe in the ordinary way. Carried by the head stock 10 is a face plate 12, projecting away from which is the centering pin or lathe center 13, with its pointed tip directed toward the tail stock 11. Suitably supported by the tail stock 11 is a corresponding lathe center or centering pin 14, also having a tapered point.

My improved boring bar comprises a cylindrical bar 15. On the end of the bar 15 adjacent to the head stock 10 is preferably detachably mounted a collar 17 secured to a bar 18. The bar 18 is slidably mounted in a groove 19ª in the face of a heavy bar 19, which is of considerably greater length than the bar 18. On the upper and lower ends of the bar 19 are cross plates 20 which close the upper and lower end of the slot 19ª, and are fastened to the bar 19 by bolts 21.

A screw threaded bolt 22 is extended through the plates 20 and longitudinally through the bar 18. On each end of the bolt 22 is secured an angular head 23, having a plurality of openings 24 to receive a tool for rotating the bolt 22.

In the face of the bar 18, adjacent to the face plate 12, are a plurality of openings 25 arranged in spaced vertical succession, and adapted to receive the point of the centering pin or lathe center 13. In Fig. 1, the parts are shown with the centering pin just in position to enter one of the openings 25.

Extending away from the face plate 12 is an arm 26, designed to limit the rotary movement of the bars 19, and the boring bar member 15 in one direction with relation to the face plate 12.

On the opposite end of the boring bar member 15 is a disk 27, the outer surface of which is curved as though to form part of the surface of a sphere, and having its center at the outer surface of the bar 18 adjacent to the face plate 12 midway between the plates 20.

Arranged in the outer space of the disk or plate 27 adjacent to the tail stock 11, are a series of holes 28, one hole being in the center of said disk, and the other holes being arranged spirally around such central hole. The holes 28 are cone-shaped with their central axes arranged on the radial lines of the sphere, hereinbefore defined.

Mounted on the boring bar member 15 is a tool holding device comprising the upper half 29 and the lower half 30. In the upper surface of the member 15 is a slot, and in the under surface of the member 29 is a corresponding slot. A key 31 is mounted in the member 29, and is adapted to slide in the slot in the bar member 15. The halves 29 and 30 are held together by means of bolts 32.

Extending upwardly from the member 29 is a cylindrical extension 34, forming a tool holder head on which is a collar or ring 33. In the member 34 are slots 35 to receive a shank of a cutting tool 36. A set screw 37 is screwed through the collar 33 for gripping the tool 36 and holding it in position.

Formed on the member 30 is a downwardly extending lug 38, having a centering pin in which is rotatably mounted a feed screw 39. The feed screw 39 is formed at its ends with portions 40 and 41, which are preferably smooth and of smaller diameter than the body of said screw. In the disk 27 is a screw-threaded opening in which is received a screw-threaded plug 42, having a central opening receiving the portion 40. On the feed screw 39, adjacent to the plug 40 is a lock nut 43. Adjacent to the outer end of the plug 42 on the portion 40 of the feed screw is a star wheel 44, fixed against rotation with relation to the feed screw 39, by means of a pin 45. The upper end of the portion 40 is screw-threaded to receive a nut 46.

Mounted on the boring bar member 15 spaced from the members 29 and 30 are smaller members 47 and 48, held together by bolts 49.

On the lower part of the member 48 is a lug 51, in which is rotatably mounted the portion 41. The portion 47 is locked against rotation with relation to the boring bar member 15 by means of a key 50. Extending upwardly from the portion 47 is a cylindrical member 52.

Slidably mounted on the cylindrical portion 52 is a collar 53, which is held against rotation by means of a key 54ª received in suitable slots in the collar 53 and the portion 52. On one side of the collar 53 is a rib or thickened portion 54, having at its outer surface a longitudinal slot 55, the ends of which are spaced apart from the upper and lower ends of the collar 53, as shown in Fig. 3. The shank of a cutting tool 56 may be inserted into the slot 55, and may be locked therein by means of a set screw 57 extended through part of the portion 54. Spacing blocks 58 may be placed above or below the cutting tool in different positions. Incidentally it may be noted that I have described the parts as though the members 52 and 34 were upright. It will, of course, be seen that they take a great variety of different positions during the rotation of the boring bar, and are described as upright here for the purpose of simplifying the description.

The collar 53 is provided with a lug 59ª extending toward the face plate 12. Secured to the upper end of the member 52 by means of a bolt 60 is a plate 61 projecting away from the member 52, above the lug 59. A feed screw 62 has the screw threaded portion mounted in a screw threaded opening in the lug 59, and a portion rotatably mounted in the curved opening in the plate 61. On the upper end of the feed screw 52 is a star wheel 63, adapted to coact with a finger or the like 64 shown by dotted lines in Fig. 1, and adapted to be mounted on any suitable part of the lathe.

Mounted on the tail stock is a catch finger 65, adapted to coact with the star wheel 44, hereinbefore described.

It may be noted that there is a cross line 80 on the face of the bar 18, and that there are indicating lines or characters 81 on the bar 19 adjacent to the bar 18 to facilitate almost as accurate adjustment as in the case of a micrometer. In this connection it may be noted that I have placed the marks 82 and 83 on one of the plates 20 and on one of the heads 23 adjacent thereto so that the screw may be accurately adjusted.

In the practical use of my improved boring bar, the material 66 in which the tapered opening is to be cut is fixed to the lathe bed in any suitable way. The boring bar is inserted through the opening in the stock 66, and is then set for boring the proper taper.

The centering pin 13 is arranged in one of the openings 25 above or below the extended central axis of the boring bar 15. The centering pin 14 is mounted in the central opening 28 in the disk 27. It will thus be noted that when the face plate 12 is rotated, carrying with it the arm 26 and the boring bar 15, the path traveled by the cutter tool 36, when the members 29 and 30 are at one end of the stock, will be a smaller circle than the path traveled by said cutter tool at the other end of the stock. In this connection it may be noted that the angular bar 15 having the disk 27 simply rotates while the other end of said tool not only rotates but travels in a circle.

The cutter tool is fed along the stock by means of the feeding screw 39. The star wheel 44 on the feeding screw 39 engages the members 65 on each rotation of the boring bar, giving it precisely a one-fifth of a rotation to the feeding screw on each rotation of the boring bar.

The opening cut by the tool 36 may be increased in size by moving the boring bar, so that the pin 14 may be inserted in one of the openings 28 above or below the central opening by moving the bar 18 correspondingly up and down, whereby both ends of the bar 15 may be made to travel in a circle, thereby increasing the total circumference of the path of travel of the cutter tool 36.

In this connection it may be noted that if it were not for the screws 22, the limit of adjustment of the boring bar, by changing the position of the centering pin 13 into different openings 25, would be determined by the distance between the successive openings 25 which would fix the minimum possible changes. Such an arrangement would not give sufficient accurate adjustment, and therefore I have provided the screws 22, whereby any degree of adjustment may be attained at one end of the boring bar.

By adjusting the pin 14 sidewise or out of the vertical line of the disk, almost any kind of an odd shaped cut may be had.

When the tool 36 is in use, the members 47 and 48 are moved to position where the part 41 travels on the lug in the part 48, so that the cutter tool 56 is not affected by either of the feeding screw devices.

Both of the members 48 and 30 are provided with set screws, as shown in Fig. 1, whereby they may be locked on the bar 15 against sliding movement, if desired. The set screws mentioned, are provided so that the members 30 and 48 and parts connected therewith may be locked at the end of the feed screw 39 where they will not be operated on thereby.

When it is desired to face the flange or end of the stock 66, the members 29 and 30 are moved to the end of the feed screw and there locked. The members 47 and 48 are left in their position, as shown in Fig. 1, or may be moved along the feed screw 39 to the other end of the boring bar, where the position of the collar 53 may be reversed.

Assuming that the parts 47 and 48 are left in the position shown in Fig. 1, the stock 66 is moved up adjacent to the tool 56, which tool is adjusted to the proper point as may be desired by means of such shifting of the blocks 58 as may be necessary, and also by adjustment of the screw 62.

It will be seen that when the star wheel 63 engages the member 64, it will return part of a revolution for moving the collar 53 longitudinally on the member 52.

The many advantages of my improved boring bar will readily be seen from the foregoing description. It is very difficult to bore a central tapered opening on account of the difficulty of properly setting and holding the boring tool in position. It is also difficult to give a sufficient variety of cuts and sufficient accuracy in changing the sizes and angles of the openings in the work. It will readily be seen that by means of my bar 19, the bar 18, and screws 22, any variety of accurate adjustments of my boring bar is obtained. The use of the disk 27 also permits the making of greater variety of cuts, for tapered openings.

Attention is called to the simplicity of the construction of my boring bar. The members 29 and 30 and 47 and 48 may be quickly and easily removed by removing the bolts 32 and 49.

The feed screw 39 may be removed from the boring bar by removing the plug or bushing 42. It may be here noted that the locking nut 43 is of smaller diameter than the hole in which the plug or bushing 42 is mounted, so that when said plug or bushing is removed, the locking collar or shoulder may be removed through the opening in the disk 27 with the feed screw.

The parts of my improved boring bar are so arranged as to obtain the greatest amount of range of graduation in tapering and cylindrical boring, and in facing work.

In this connection I may state that I have considered several forms of boring bars with different ways of mounting the feed screw, and the like, but involving the substantial principles of my device, as here disclosed.

While I appreciate the fact that numerous changes may be made in the construction and arrangement of the parts of my improved boring bar, without departing from its essential features and purposes, it is my intention to cover by this application any such changes which may be included within the scope of my claims.

I claim as my invention:

1. In a boring bar, a boring bar rod, means for mounting one end thereof on a lathe, means for mounting the other end thereof on a lathe, said means comprising a face plate designed to be mounted on the lathe, a centering pin extending away from said face plate, a bar mounted on said rod, a bar slidably mounted in said first bar, screws supported with relation to said first bar and bearing against the ends of the second bar.

2. In a boring bar, a boring bar rod, means for mounting one end thereof on a lathe, means for mounting the other end thereof on a lathe, said means comprising a face plate designed to be mounted on the lathe, a centering pin extending away from said face plate, an arm on the face plate parallel with said centering pin, a bar mounted on said rod, a bar slidably mounted in said first bar, screws suitably supported with relation to said first bar and bearing against the ends of the second bar, said second bar having a plurality of openings for receiving the end of said centering pin.

3. In a boring bar, a boring bar rod, means for adjustably mounting one end of said bar on the lathe, means for mounting the other end of said bar on the lathe, said means including a centering pin designed to be mounted on the lathe, and a disk mounted on the adjacent end of the boring bar rod having a convex face curved on the arc of a circle having its center at the opposite end of the boring bar rod, and provided with a plurality of openings to receive said centering pin arranged at a variety of distances from the center of the curved face of said disk.

4. In a boring bar, a boring bar rod, means for mounting one end thereof on a lathe, said means comprising a face plate designed to be mounted on the lathe, a centering pin extending away from said face plate, an arm on the face plate parallel with said centering pin, a bar mounted on said rod, a bar slidably mounted in said first bar, screws suitably supported with relation to said first bar and bearing against the ends of the second bar, said second bar having a plurality of openings for receiving the end of said centering pin, means for mounting the other end of the bar on a lathe comprising a centering pin on the lathe, and a disk mounted on the adjacent end of the boring bar rod having a convex face provided with a plurality of openings receiving said centering pin arranged at a variety of distances from the center of the curved face of said disk and arranged out of alinement with each other.

Des Moines, Iowa, October 13, 1915.

RICHARD W. MEWES.